(12) United States Patent
Goeppert

(10) Patent No.: US 9,014,935 B2
(45) Date of Patent: Apr. 21, 2015

(54) METHOD FOR THE SLIP REGULATION OF A FRICTION CLUTCH AND CLUTCH ACTUATOR THEREFOR

(75) Inventor: Georg Goeppert, Hausach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 3 days.

(21) Appl. No.: 13/459,352

(22) Filed: Apr. 30, 2012

(65) Prior Publication Data

US 2012/0211323 A1 Aug. 23, 2012

Related U.S. Application Data

(63) Continuation of application No. PCT/DE2010/001216, filed on Oct. 14, 2010.

(30) Foreign Application Priority Data

Nov. 9, 2009 (DE) .......................... 10 2009 052 515

(51) Int. Cl.
*F16D 48/06* (2006.01)

(52) U.S. Cl.
CPC .......... *F16D 48/064* (2013.01); *F16D 2300/18* (2013.01); *F16D 2500/1023* (2013.01); *F16D 2500/3021* (2013.01); *F16D 2500/5012* (2013.01)

(58) Field of Classification Search
CPC ......... H02K 29/08; G06F 19/00; B60K 17/08
USPC ............... 192/84.6, 3.22, 3.56, 3.58, 48.606, 192/48.607, 48.609, 66.1, 85.19; 701/29
See application file for complete search history.

(56) References Cited

U.S. PATENT DOCUMENTS

| | | | | |
|---|---|---|---|---|
| 4,697,125 A | * | 9/1987 | Goff et al. | 318/400.12 |
| 5,543,696 A | * | 8/1996 | Huggett et al. | 318/590 |
| 7,702,086 B2 | * | 4/2010 | Susen et al. | 379/93.02 |
| 2009/0164058 A1 | * | 6/2009 | Seufert et al. | 701/29 |

FOREIGN PATENT DOCUMENTS

| | | | |
|---|---|---|---|
| DE | 103 23 567 A1 | | 12/2003 |
| DE | EP 1512213 | * | 3/2005 |
| DE | 10 2006 017 146 A1 | | 11/2006 |
| DE | 10 2006 056 318 A1 | | 6/2007 |
| EP | 0 239 026 A2 | | 9/1987 |
| EP | 0 323 860 A2 | | 7/1989 |
| WO | 03/100950 A1 | | 12/2003 |
| WO | WO 03100950 A1 | * | 12/2003 |

* cited by examiner

*Primary Examiner* — Helal A Algahaim
*Assistant Examiner* — Michael Fouche
(74) *Attorney, Agent, or Firm* — Lucas & Mercanti, LLP

(57) ABSTRACT

A method for slip regulation of a friction clutch by a clutch actuator operated by an electronically commutated electric motor. Here, rotational motion of a rotor is converted into an axial advancement that sets a predetermined slip. The rotational motion is controlled by Hall sensors arranged over a circumference around a rotational axis of the rotor. Magnetizable magnet segments, which are offset from each other in the circumferential direction, communicate depending on continuously detected signals of the Hall sensors. To perform the slip regulation even for axial travels of the clutch actuator that correspond to an angular position of the rotor between two Hall sensors, the signals of the Hall sensors over the circumference are evaluated in an analog manner, and an angular position of the rotor between two sensors is determined by comparing two signals adjacent to each other in the circumferential direction with each other.

6 Claims, 1 Drawing Sheet

METHOD FOR THE SLIP REGULATION OF A FRICTION CLUTCH AND CLUTCH ACTUATOR THEREFOR

CROSS-REFERENCE TO RELATED APPLICATIONS

This application is a continuation of PCT/DE2010/001216 filed Oct. 14, 2010, which in turn claims the priority of DE 10 2009 052 515.7 filed Nov. 9, 2009. The priority of these applications is hereby claimed and these applications are incorporated by reference herein

FIELD OF THE INVENTION

The invention relates to a method for the slip regulation of a friction clutch by a clutch actuator operated by an electronically commutated electric motor.

BACKGROUND OF THE INVENTION

DE 103 23 567 A1 discloses a method and device for controlling the slip of a friction clutch. In this context, a clutch actuator is controlled by a control device in such a way that a predefined slip between the friction clutch, which is mounted on the crank shaft of an internal combustion engine and a clutch disk, which bears friction linings and is connected to the gear mechanism input shaft of a gear mechanism is set on the friction clutch, in order to reduce or eliminate grabbing during the coupling-in phase of the friction clutch. In this context, the clutch actuator is modulated by the control device with respect to its advancing movement. The clutch actuator contains an electronically commutated electric motor, which commutates on the basis of Hall sensors, arranged over the rotational axis of the rotor, and the signals thereof, and is controlled with respect to its rotational speed. Such an electronically commutated electric motor is known, for example, from DE 10 2006 017 146 A1. In this context, the rotation of the rotor is determined incrementally by means of a plurality of Hall sensors distributed over the circumference, by determining the switching points of the Hall sensors when there is a change of polarization of magnets rotating past the Hall sensors. Angular increments, which supply a predefined angular resolution as a function of a predefined number of Hall sensors, are determined therefrom. In order to be able to determine a smoothed rotational speed profile of the rotor, it is possible to average between two or more discretely determined incremental angular values.

The data which is acquired from the signals and evaluated is used to control the commutation of the electric motor. In this context, a power transistor is switched in a digital manner under conditions which apply to the commutation of a magnetizable magnet segment such as the winding, and when the conditions apply to the next winding is switched off again. Accordingly, the rotor is then driven in digitized fashion as a manner of the resolution of the Hall sensors. The driving is unnoticeable at relatively high rotational speeds. When slip regulation of a friction clutch is applied, the friction clutch is moved comparatively quickly over predefined axial travel by the clutch actuator, During travel the slip is regulated with a predefined slip rotational speed. The axial travel of the friction clutch and therefore, the clutch actuator for regulating the slip rotational speed is very low here, with the result that correspondingly small rotational angles of the rotor are necessary. The rotational angles can be in angular ranges of the angular resolution of the Hall sensors, for example between two switching points of two Hall sensors which are adjacent in the circumferential direction. In this way, slip control is possible only with a comparatively large control width and therefore increased slip rotational speeds, which leads to increased wear-inducing feeding of heat into the friction clutch and therefore to a higher consumption of fuel.

SUMMARY OF THE INVENTION

The present invention provides a method for controlling a clutch actuator and a clutch actuator that have a relatively high resolution of axial travel in order to be able to economically control a friction clutch and in a way which is less susceptible to wear.

This is accomplished in the present invention by a method for the slip regulation of a friction clutch by a clutch actuator operated by an electronically commutated electric motor. In the clutch actuator a rotational movement of a rotor of the electric motor is converted into axial travel which sets a predetermined slip. The rotational movement is controlled by means of a plurality of Hall sensors which are arranged over the circumference around a rotational axis of the rotor. Magnetizable magnet segments which are offset with respect to one another in the circumferential direction are commutated as a function of continuously sensed signals of the Hall sensors. The signals of the Hall sensors are evaluated in an analog fashion over the circumference and an angular position of the rotor between two sensors is determined by comparing two signals adjacent in the circumferential direction with each other.

It has become apparent that the sensors per se do not exhibit any digital behavior, but rather the sensor signal exhibits sinusoidal behavior if a magnet element which rotates with the rotor is moved past the Hall sensor. Accordingly, through the evaluation of these analog signal lines by a plurality of Hall sensors arranged over the circumference, it is possible for an analog signal which is continuous over one rotation of the rotor to be determined by virtue of the fact that the individual signals of the Hall sensors are evaluated. In particular, by comparing the signals of two Hall sensors which are adjacent in the circumferential direction it is possible for each angle of the rotor between two Hall sensors to be resolved in the scope of the resolution of the analog signal. As a result, given the same number of Hall sensors the resolution increases to such an extent that digitized behavior of the rotor is no longer observed and/or the number of Hall sensors can be reduced, with the result that expenditure on the determination of the rotational speed of the rotor can be reduced.

The increased resolution of the angular position of the rotor allows the latter to be set precisely to various positions between the angular positions of the Hall sensors and secured. In this way, the axial resolution of the axial travel also increases, with the result that the slip at the friction clutch is controlled more accurately and can be secured to a low differential rotational speed between a friction clutch and clutch disk. It has become apparent that given an average regulation frequency of one hertz, that is to say one regulation impulse per second, differential rotational speeds of less than 12 rpm can be set. This permits the friction clutch to be operated with relatively little feeding in of heat, and therefore allows fuel to be saved owing to the reduced feeding in of heat.

By virtue of the sensing of the sinusoidal signals of the Hall sensors over the rotational angle of the rotor it is possible for the windings of the electric motor to be commutated in sinusoidal fashion in accordance with the sinusoidal signals of the associated Hall sensor, instead of block wise commutation of the electric motor during which one phase or winding of an electric motor is commutated as a function of the associated signal of the Hall sensor, Which is digital and therefore incremental over the rotational angle of the rotor, with a predefined constant excitation current or an associated excitation voltage, for example in the form of a voltage which is input over a predefined pulse width. This means that a sinusoidal excitation current or a correspondingly sinusoidal excitation voltage is impressed on the windings over a predefined rotational angle. According to one advantageous exemplary embodiment, in this context the magnetizable magnet segments are energized in an analog fashion as windings of different phases of the electric motor as a function of an analog control variable which is determined from the analog signals of the Hall sensors. Analog energization means, in contrast to digital control, no time-consuming switching on and switching off processes. In this context, for the purpose of analog energization, components of power electronics, for example continuously connected or controlled transistors, can be used in the same way.

According to the inventive method, in this context not only the commutation of the magnetizable magnet segments is provided as a function of an analog evaluation of the Hall sensors in order to secure the rotor, for example, in an angular position between two Hall sensors. Instead, it is possible to determine, as it were, in an analog fashion the axial travel of the clutch actuator from the analog signals of the Hall sensors taking, into account the transmission ratio of a gear mechanism for converting the rotational movement of the electric motor into said axial travel of the clutch actuator. The regulation of the axial travel can be carried out with improved resolution on the basis of this axial travel.

The invention is further provides a clutch actuator for a friction clutch having an electrically commutated electric motor with a rotor and a gear mechanism which converts the rotational speed of the rotor into an axial advancing movement, and power electronics for controlling and energizing the electric motor using the method according to the invention which is described in the application documents.

BRIEF DESCRIPTION OF THE DRAWINGS

The invention will be explained in more detail with reference to FIGS. 1 and 2, in which.

DETAILED DESCRIPTION OF THE INVENTION

Figure 1:
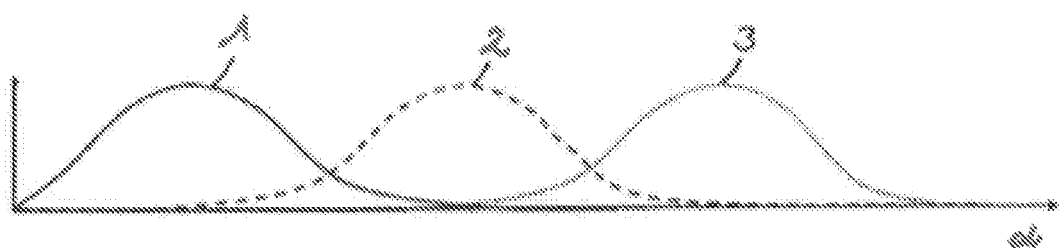
FIG. 1 shows a diagram with the developed view of sensor signals of three Hall sensors plotted over the rotor angle.

FIG. 1 shows the signal profiles 1, 2, 3, sensed in analog fashion, of three Hall sensors arranged uniformly one next to the other in the circumferential direction of the rotor, over the rotational angle $\alpha$ of the rotor of an electric motor. The signal profiles 1, 2, 3 are sinusoidal and overlap one another, in such a way that the signals of two Hall sensors are available to each rotational angle $\alpha$ of the rotor, and can be determined discretely and with high resolution by means of the information as to which sensors are involved with which signal component. The invention is not restricted by the fact that the signal profiles 1, 2, 3 which occur in analog fashion in the sensors are digitized in a signal processing step in a sensor in-situ electronics system or in a control unit, for example by means of an A/D converter.

Figure 2:
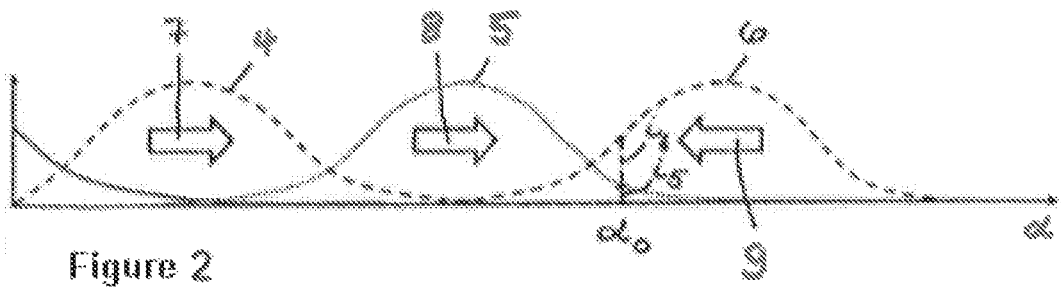
FIG. 2 shows a diagram of an angular position of the rotor by means of analog energization of two windings of the rotor.

FIG. 2 shows the commutation, occurring on the basis of the signal profiles 1, 2, 3 of FIG. 1, of the magnetizable magnet elements such as windings or coils over the rotational angle $\alpha$ of the rotor in the form of the commutation current profiles 4, 5, 6. The windings are commutated here in chronological succession and bring about rotation of the rotor in the direction of the arrows 7, 8. If the rotor is to be sett or adjusted to an angular position $\alpha_0$, which is located between two commutation current maximum values and, if appropriate, between two angular positions of the sensors, the rotor is secured at this angular position $\alpha_0$ by feeding in and securing the current components $i_6$, $i_5$, present at the angular position $\alpha_0$, by means of the opposing component of the commutation current (indicated by the arrow 9). A significantly better angular resolution of the rotational angle $\alpha$ is achieved by means of the improved analog commutation and analog sensing of the sensor signals compared to digital commutation profiles which energize each of the windings in digital fashion at the maximum values of the signal profiles 1, 2, 3 in FIG. 1 and then switch off the commutation current again, since during the analog sensing of the signal profiles 1, 2, 3 (FIG. 1) and the analog energization of the windings for their commutation, the resolution of the rotational angle $\alpha$ depends only on the resolution of the analog signals or of the analog currents.

LIST OF REFERENCE SYMBOLS

1 Signal Profile
2 Signal Profile
3 Signal Profile
4 Commutation Current Profile
5 Commutation Current Profile
6 Commutation Current Profile
7 Arrow
8 Arrow
9 Arrow
$\alpha$ Rotational Angle
$\alpha_0$ Angular Position
$i_5$ Current Component
$i_6$ Current Component

What is claimed:

1. A method for slip regulation of a friction clutch of a clutch actuator operated by an electronically commutated electric motor, the method comprising the steps of:
    converting in the clutch actuator a rotational movement of a rotor of the electric motor into axial travel which sets a predetermined slip;
    controlling the rotational movement by a plurality of Hall sensors, which are arranged over a circumference around a rotational axis of the rotor;
    commutating magnetizable magnet segments, which are offset with respect to one another in the circumferential direction, in a sinusoidal fashion as a function of continuously sensed signals of the Hall sensors;
    evaluating sinusoidal curve signals of the Hall sensors in an analog manner over the circumference to determine an analog signal that is continuous over one rotation of the rotor; and
    determining an angular position of the rotor between two of the Hall sensors in the scope of the resolution of the analog signal by comparing the signals of the two of the Hall sensors, which are adjacent in the circumferential direction, with each other.

2. The method as claimed in claim 1, further comprising energizing the magnetizable magnet segments in an analog manner as a function of an analog control variable, which is determined from analog signals of the Hall sensors.

3. The method as claimed in claim 2, wherein the magnetizable magnet segments are energized by continuously connected transistors.

4. The method as claimed in claim 1, including determining the axial travel from the signals of the Hall sensors taking into account a transmission ratio of a gear mechanism for converting the rotational movement of the electric motor into axial travel.

5. A clutch actuator for a friction clutch, comprising:
an electrically commutated electric motor having a rotor, a gear mechanism, which converts rotational speed of the rotor into an axial advancing movement; and power electronics for controlling and energizing the electric motor by converting in the clutch actuator a rotational movement of a rotor of the electric motor into axial travel which sets a predetermined slip; controlling the rotational movement by a plurality of Hall sensors, which are arranged over a circumference around a rotational axis of the rotor; commutating magnetizable magnet segments, which are offset with respect to one another in the circumferential direction, in a sinusoidal fashion as a function of continuously sensed signals of the Hall sensors; evaluating sinusoidal curves of the signals of the Hall sensors in an analog manner over the circumference to determine an analog signal that is continuous over one rotation of the rotor; and determining an angular position of the rotor between two of the Hall sensors in the scope of the resolution of the analog signal by comparing the signals of the two of the Hall sensors, which are adjacent in the circumferential direction, with each other.

6. The method as claimed in claim 1, wherein the step of commutating magnetizable magnet segments comprises continuously controlling the magnet segments as a function of the signals of the Hall sensors without switching off and switching on processes.

* * * * *